United States Patent [19]

Wicki et al.

[11] 4,358,287
[45] Nov. 9, 1982

[54] ASYMMETRIC 1:2 METAL COMPLEXES OF DIAZO COMPOUNDS

[75] Inventors: Heinz Wicki, Basel, Switzerland; Claude Vogel, Laint-Louis, France

[73] Assignee: Sandoz Ltd., Basel, Switzerland

[21] Appl. No.: 253,683

[22] Filed: Apr. 13, 1981

Related U.S. Application Data

[63] Continuation-in-part of Ser. No. 200,158, Oct. 24, 1980, abandoned, which is a continuation-in-part of Ser. No. 153,497, May 27, 1980, abandoned.

[30] Foreign Application Priority Data

May 28, 1979 [CH] Switzerland .......................... 4946/79
Jan. 7, 1980 [CH] Switzerland ............................ 64/80

[51] Int. Cl.³ .................... C09B 45/00; C09B 45/26
[52] U.S. Cl. ................................. 8/540; 8/437; 8/651; 8/685; 8/687; 260/145 A; 260/145 C; 260/146 R; 260/148; 260/155
[58] Field of Search ............... 260/145 A, 145 C, 148, 260/155; 8/437, 539, 641, 674, 687, 540, 685

[56] References Cited

U.S. PATENT DOCUMENTS

| | | | |
|---|---|---|---|
| 4,123,428 | 10/1978 | Holliger et al. | 260/145 C |
| 4,150,942 | 4/1979 | Holliger et al. | 8/437 |
| 4,212,802 | 7/1980 | Vogel et al. | 260/145 A |

FOREIGN PATENT DOCUMENTS 3018761 12/1980 Fed. Rep. of Germany.
2002410 2/1979 United Kingdom.

*Primary Examiner*—A. Lionel Clingman
*Attorney, Agent, or Firm*—Gerald D. Sharkin; Richard E. Vila; Melvyn M. Kassenoff

[57] ABSTRACT

1:2 Metal complexes of the formula

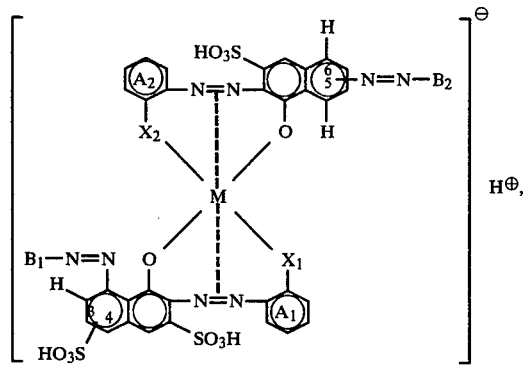

in which
each of $X_1$ and $X_2$, independently, is —COO— or —O—,
each of $B_1$ and $B_2$, independently, is a radical of a coupling component of the benzene or oxyquinoline series,
M is a metal capable of forming a 1:2 complex and, each of

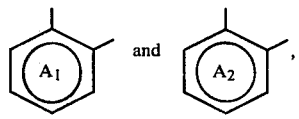

independently, is the radical of a diazo component of the benzene series, with the proviso that at most one of such diazo component radicals contains a single sulpho group, and mixtures thereof with one or more of the corresponding symmetrical 1:2 metal complexes, which complexes and mixtures of complexes are in free acid or salt form and are useful as anionic dyes for dyeing and printing substrates such as natural and regenerated cellulose, natural and synthetic polyamides, polyurethanes and polymers modified to contain basic groups, especially leather.

39 Claims, No Drawings

ASYMMETRIC 1:2 METAL COMPLEXES OF DIAZO COMPOUNDS

This application is a continuation-in-part of application Ser. No. 200,158, filed Oct. 24, 1980 and now abandoned, which is a continuation-in-part of application Ser. No. 153,497, filed May 27, 1980 and now abandoned.

The present invention relates to 1:2 metal complexes, and mixtures thereof, their production and use as dyestuffs.

Accordingly, the present invention provides 1:2 metal complexes of formula I

M is a metal capable of forming a 1:2 complex, each of

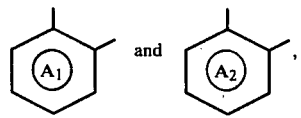

independently, is the radical of a diazo component of the benzene series, with the proviso that at most one of such diazo component radicals contains a single sulpho group, which complexes are free from fibre reactive groups

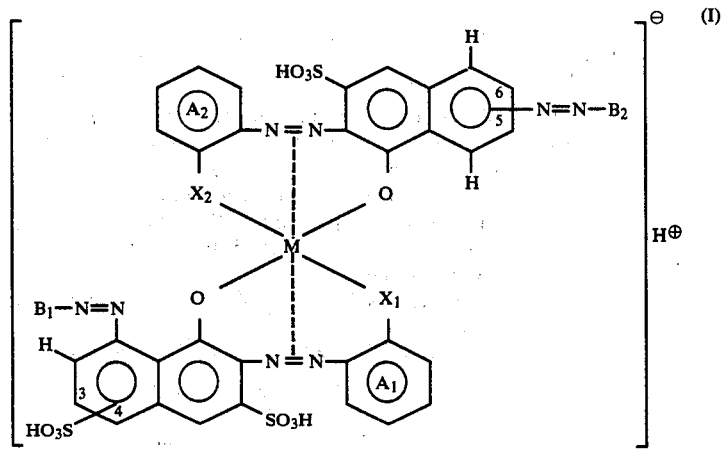

in which
each of $X_1$ and $X_2$, independently, is —COO— or —O—,
each of $B_1$ and $B_2$, independently, is a radical of a coupling component of the benzene or oxyquinoline series, and are in free acid or salt form.

The present invention also provides mixtures comprising at least one complex of formula I, as defined above, together with at least one 1:2 complex of formula Ia and/or at least one 1:2 complex of formula Ib,

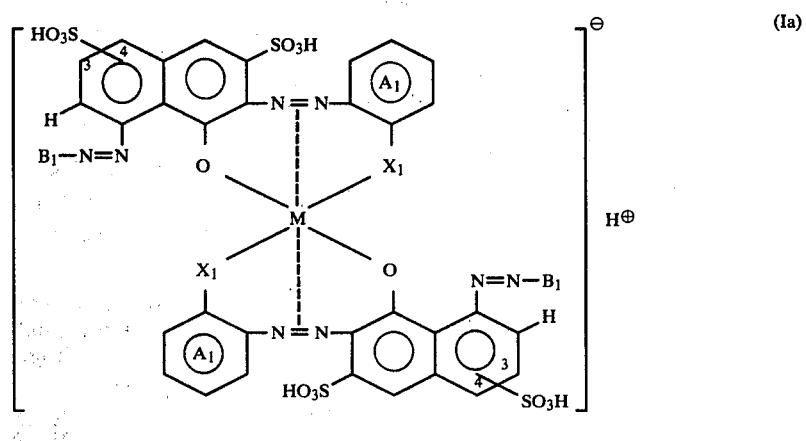

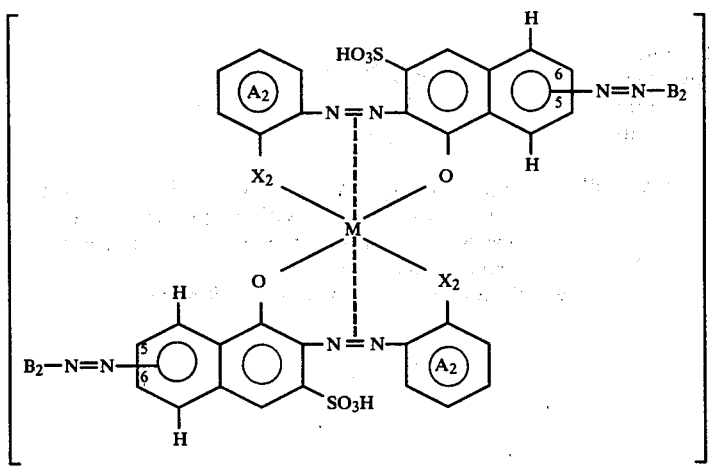

in which $X_1$, $X_2$, $B_1$, $B_2$,

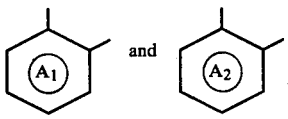

are as defined above and may be the same or different, and M is as defined above, which complexes in said mixture are free from fibre reactive groups and are in free acid or salt form.

In the complexes of formula I preferably at least one of $X_1$ and $X_2$ is —O—, more preferably both are —O—. In the complexes of formulae Ia and Ib at least one of the $X_1$'s, respectively $X_2$'s is —O—, most preferably each $X_1$ is —O— and each $X_2$ is —O—.

The benzene rings $A_1$ and $A_2$ may be further substituted by substituents common for diazo components of the benzene series in anionic metal complex dyestuffs. Advantageously, the benzene rings are further unsubstituted or further substituted by up to two substituents selected from the group consisting of halogen, nitro, $C_{1-4}$alkyl, $C_{1-4}$alkoxy, sulpho —$SO_2NR_1R_2$, with the proviso that a maximum of one substituent is selected from the group consisting of sulpho and —$SO_2NR_1R_2$. Preferably a maximum of one of such substituents is selected from alkyl and alkoxy, and preferably a maximum of one halogen atom is present. Further, when the group —$SO_2NR_1R_2$ is present on any one of the rings $A_1$ and $A_2$ such ring preferably bears no further substituents. Further, when $A_1$ or $A_2$ bears a sulpho group, the other is free from sulpho groups.

$R_1$ is hydrogen or $C_{1-4}$alkyl,
$R_2$ is hydrogen, $C_{1-4}$alkyl or

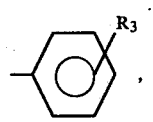

and
$R_3$ is hydrogen, halogen, $C_{1-4}$alkyl, $C_{1-4}$alkoxy or carboxy.

By halogen is meant chlorine, bromine, fluorine and iodine. The preferred halogens are chlorine and bromine, with chlorine being most preferred.

Any $C_{1-4}$alkyl and $C_{1-4}$alkoxy are preferably $C_{1-2}$alkyl and $C_{1-2}$alkoxy, especially methyl and methoxy.

$R_1$ is preferably $R_1'$ where $R_1'$ is hydrogen or methyl, especially hydrogen.

$R_3$ is preferably $R_3'$, where $R_3'$ is hydrogen, methoxy or carboxy.

$R_2$ is preferably $R_2'$, where $R_2'$ is hydrogen, methyl or

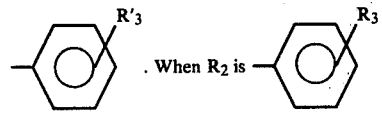

$R_1$ is preferably hydrogen.

Preferably any —$SO_2NR_1R_2$ is —$SO_2NR_1'R_2'$, especially —$SO_2NHR_2''$, where $R_2''$ is methyl, carboxyphenyl or phenyl.

Preferred groups of formulae

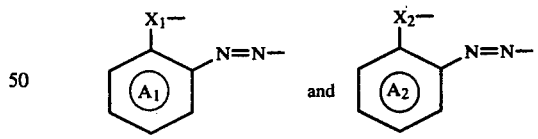

are those of formulae

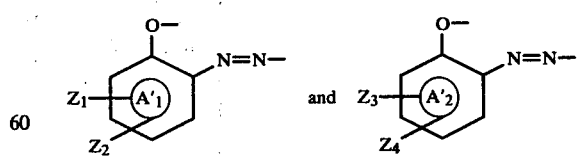

in which each of
$Z_1$ and $Z_3$, independently, is hydrogen or nitro,
$Z_2$ is hydrogen, chlorine, nitro, or —$SO_2NR_1'R_2'$, and
$Z_4$ is hydrogen, chlorine, nitro, sulpho or —$SO_2NR_1'R_2'$.

$Z_2$ is preferably chlorine, nitro, or —SO$_2$NR$_1'$R$_2'$ and $Z_4$ is preferably chlorine, nitro, sulpho or —SO$_2$NR$_1'$R$_2'$, whereby when $Z_2$ and/or $Z_4$ is —SO$_2$NR$_1'$R$_2'$, $Z_1$ resp. $Z_3$ is preferably hydrogen.

When $X_1$ is —COO—, ring $A_1$ is preferably further unsubstituted, and when $X_2$ is —COO—, ring $A_2$ is preferably further unsubstituted.

The coupling component radicals $B_1$ and $B_2$ may, apart from one or more substituents which activate coupling, e.g. amino (primary, sec. or tert.) or hydroxy, bear further substituents common for such coupling component radicals in anionic disazo dyestuffs.

Preferably the coupling component radicals contain at maximum two substituents which activate coupling (max. of 1 hydroxy group) and are further unsubstituted or substituted by an alkyl (Preferably C$_{1-4}$) or alkoxy (preferably C$_{1-4}$) group or by a halogen atom.

Preferred coupling component radicals as $B_1$ and $B_2$ are those from coupling components of formulae (a), (b) and (c)

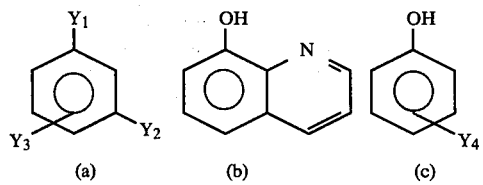

in which
$Y_1$ is —NH$_2$ or —OH,
$Y_2$ is —NH$_2$ or

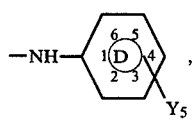     (d)

$Y_3$ is hydrogen, C$_{1-4}$alkyl, C$_{1-4}$alkoxy or chlorine, with the proviso that when $Y_3$ is C$_{1-4}$alkyl, C$_{1-4}$alkoxy or chloro and $Y_1$ and $Y_2$ are both —NH$_2$, it is ortho or para to $Y_1$ and otherwise it is para to $Y_1$,
$Y_4$ is hydrogen C$_{1-4}$alkyl, C$_{1-4}$alkoxy or chlorine, and
$Y_5$ is hydrogen or C$_{1-4}$alkyl.

$Y_3$ is preferably hydrogen or methyl.

When $Y_2$ is (d), $Y_1$ is preferably hydroxy and $Y_3$ is preferably hydrogen. $Y_5$ is preferably in the 2- or 4-position, more preferably in the 2-position.

$Y_4$ is preferably hydrogen, chlorine or methyl.

More preferred coupling components of formula (a) are those of formula (a')

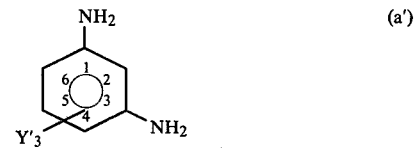

in which $Y_3'$ is hydrogen or methyl with such methyl being in the 2- or 4-position, preferably the latter. When $Y_3'$ is methyl a technical mixture of diaminotoluenes can be employed as coupling component, i.e. 2,4-diaminotoluene and 2,6-diaminotoluene with up to 50%, preferably from 20 to 35%, by weight of the latter.

Of the coupling components of formulae (a), (b) and (c), those of formulae (a) and (b) are preferred, more preferably (a') and (b), with those of formula (a') being most preferred, especially those wherein $Y_3'$ is hydrogen.

The floating sulpho group in the 1:2 metal complexes of formula I is preferably in the 3-position. Preferred mixtures are those in which the floating sulpho group in the complexes of formulae I and Ia is in the 3-position of the naphthalene nucleus.

In the complexes of formulae I, Ia and Ib, M is preferably chromium.

Among the preferred complexes of formula I are those wherein each of rings $A_1$ and $A_2$, independently, is further unsubstituted or further substituted by one or two substituents selected from the group consisting of halo, nitro, C$_{1-4}$alkyl, C$_{1-4}$alkoxy, sulpho and —SO$_2$NR$_1$R$_2$, wherein R$_1$ and R$_2$ are as defined above, with the provisos that each of rings $A_1$ and $A_2$ independently contains a maximum of one substituent selected from sulpho and —SO$_2$NR$_1$R$_2$ and together contain a maximum of one sulpho group and that ring $A_1$ is further unsubstituted when $X_1$ is —COO— and ring $A_2$ is further unsubstituted when $X_2$ is —COO—. Of these complexes, those wherein any halo is chloro or bromo and each of $B_1$ and $B_2$ is independently the radical of a coupling component of formula (a), (b) or (c) are more preferred.

Preferred 1:2 complexes of formula I are those of formula I',

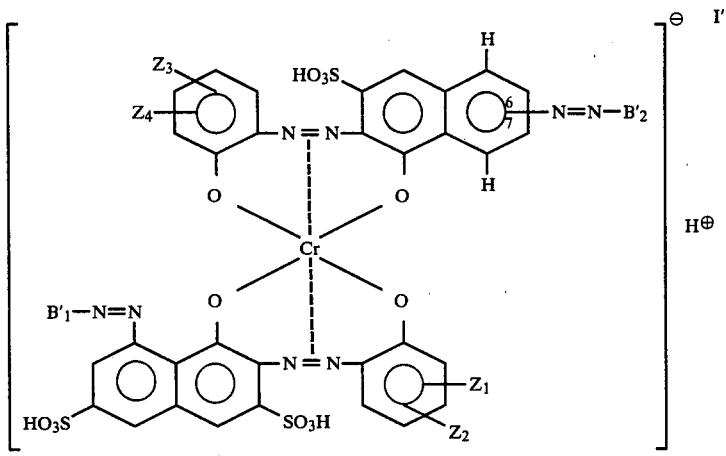

in which
Z₁ to Z₄ are as defined above, and
each of $B_1'$ and $B_2'$, independently, is the radical of a coupling component of formula (a), (b) or (c), preferably (a) of (b), with those where each of $B_1'$ and $B_2'$, independently, is the radical of a coupling component of formula (a) or (b) being most preferred.

When at least one sulpho group of the 1:2 metal complex is in salt form and the negative charge on the chromium ion is balanced by a cation, said cation is identical to the cation of a sulpho group of the complex.

Other preferred complexes of formula I' are those wherein $Z_2$ is chloro, nitro or $-SO_2NR_1'R_2'$, and $Z_4$ is chloro, nitro, sulpho or $-SO_2NR_1'R_2'$, with the proviso that $Z_1$ is hydrogen when $Z_2$ is $-SO_2NR_1'R_2'$ and $Z_3$ is hydrogen when $Z_4$ is $-SO_2NR_1'R_2'$.

More preferred complexes of formulae I and I' are those where both $B_1$ and $B_2$ respectively $B_1'$ and $B_2'$ are the same. Especially preferred complexes are those of formula I' in which $Z_1$ to $Z_4$ are ortho or para to —O— and have the preferred significances as given above.

The complexes of formulae I, Ia and Ib are in free acid or salt form. Preferably the complexes are in salt form. Suitable cations for the salt form are those non-chromophoric cations common in anionic metal complexes. Preferred cations are alkali metal and ammonium, for example sodium, lithium, potassium, ammonium, mono-, di- and tri-isopropanolammonium, mono-, di- and tri-ethanolammonium etc. By ' salt form' is meant that an acid group in the molecule is in salt form and additionally the cation compensating the negative charge on the metal ion may be hydrogen or one of the cations of the salt form of any acid groups in the complex.

Preferred mixtures of complexes are mixtures of a complex of formula I' with at least one complex of formula I'a and/or at least one complex of formula I'b

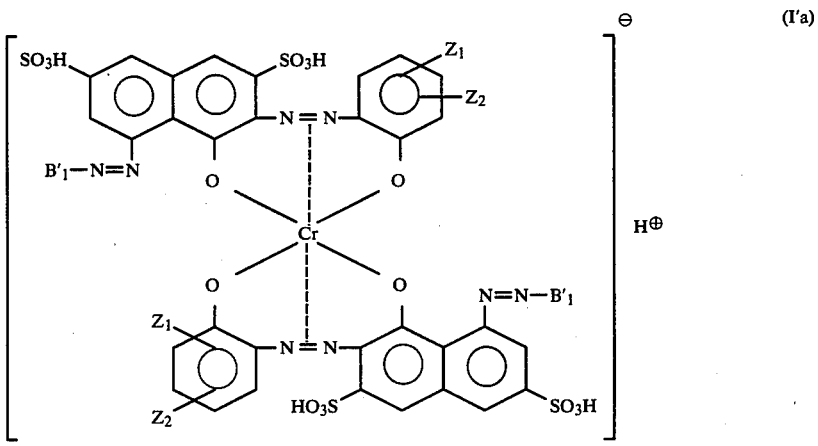

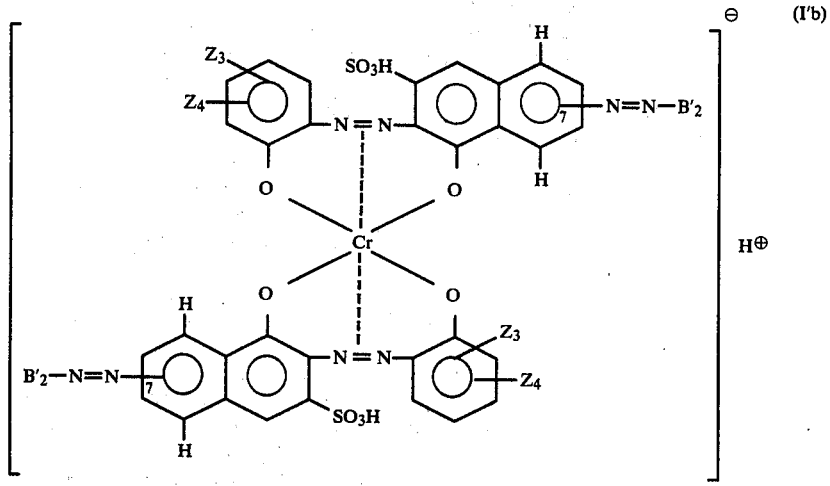

wherein each $Z_1$, $Z_2$, $Z_3$, $Z_4$, $B_1'$ and $B_2'$ independently is as defined above.

Preferably, each $B_1'$ and $B_2'$ is independently the radical of a coupling component of formula (a) or (b), more preferably (a') or (b) and most preferably (a'). More preferred mixtures are those wherein each $B_1'$ and $B_2'$ is independently the radical of a coupling component of formula (a') and wherein $Z_1$ is hydrogen when $Z_2$ is $-SO_2NR_1'R_2'$ and $Z_3$ is hydrogen when $Z_4$ is $-SO_2NR_1'R_2'$. Further preferred mixtures of complexes of formulae I', Ia' and Ib' are those wherein each $Z_1$ is the same, each $Z_2$ is the same, each $Z_3$ is the same, each $Z_4$ is the same, each $B_1'$ is the same and each $B_2'$ is the same. Of these mixtures, those wherein the $B_1''$s and the $B_2''$s are the same are more preferred with those wherein, in addition, each $B_2'-N=N-$ is in the 7-position, each $Z_1$ is in the same position, each $Z_2$ is in the same position, each $Z_3$ is in the same position and each $Z_4$ is in the same position being even more preferred.

Further preferred mixtures of complexes according to the present invention comprise 1:2 metal complexes of 50 to 95 mol % compound of formula ($\alpha$)

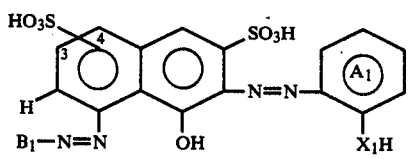

or a mixture thereof, and 50-5 mol % compound of formula ($\beta$)

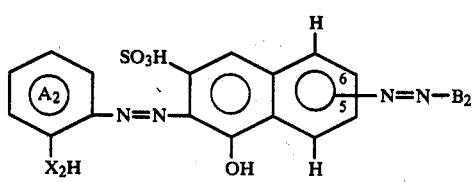

or a mixture thereof, which complexes are in free acid or salt form.

More preferably the mixture comprises 1:2 complexes of 60 to 95, especially 75 to 85, mol % compound of formula ($\alpha$) and 40 to 5, especially 25 to 15, mol % compound of formula ($\beta$).

The mixtures may be prepared either by admixing a complex of formula I with one of formula Ia and/or Ib or by metallising a mixture of the compounds of formulae ($\alpha$) and ($\beta$) or alternatively by metallising a mixture of compounds of formulae ($\alpha$) and ($\beta$) but where the $B_1-N=N-$ and $B_2-N=N-$ groups are replaced by $-NH_2$ groups, followed by diazotizing and coupling with coupling components $B_1H$ and $B_2H$. When a 1:2 complex of formula I alone is desired then an 1:1 complex of the compound of formula ($\alpha$) or ($\beta$) is prepared and the 1:1 complex is then reacted further with the compound of formula ($\beta$) or ($\alpha$), as the case may be, in accordance with known methods. The starting materials for the preparation of such complexes of formula I are either known or may be made in accordance with known methods.

The diazotization, coupling and metallization reaction may be effected in accordance with known methods. The complexes of formulae Ia and Ib are known or may be prepared in accordance with known methods, for example as described in DOS No. 2,832,756 and U.S. Pat. No. 4,150,942.

The complexes of formula I and the mixtures according to present invention containing the same are useful for dyeing anionic dyeable substrates. The complexes and mixtures may optionally be admixed with blending agents. Suitable anionic dyeable substrates are natural and regenerated cellulose, natural and synthetic polyamides, polyurethanes, basic modified polymers, such as basically modified polypropylene. The most preferred substrates are synthetic polyamides, wool and leather, especially the latter. The textile substrates may be in loose fibre, fabric or yarn form. The leather may be tanned in conventional manner, e.g. natural or synthetic and/or chrome tanned. Dyeing may be carried out by known methods for example padding, exhaust dyeing or printing.

The complexes of the invention have good colour stability. The complexes and the mixtures have good build-up power on leather of weak affinity. The even dyeings obtained have good light fastness, and notable rubbing-, wash-, sweat- and dry cleaning-fastness. The leather dyeings show good resistance to migration in PVC.

The following Examples further serve to illustrate the invention. In the Examples the temperatures are in degrees Centigrade and the parts and percentages are by weight.

EXAMPLE 1

264 Parts 2-amino-1-hydroxybenzene-4-sulphonic acid phenylamide are dissolved in 1000 parts water with the addition of aqueous sodium hydroxide. 70 parts sodium nitrite are added to the solution. The solution is slowly added (dropwise) to a stirred mixture of ice and hydrochloric acid. After diazotization a solution of 319 parts 1-amino-8-hydroxy-3,6-disulphonaphthalene in 400 parts water and 250 parts aqueous sodium hydroxide is stirred into the diazonium solution and coupling is effected at pH 10.

234 parts 2-amino-6-nitrophenol-4-sulphonic acid are stirred in water, hydrochloric acid and ice and are diazotized with the dropwise addition of sodium nitrite.

239 parts 2-amino-8-hydroxy-6-sulphonaphthalene are dissolved in water with the addition of aqueous sodium hydroxide and at pH 11 the solution is added dropwise with stirring, to the diazo suspension of 2-amino-6-nitrophenol-4-sulphonic acid. After coupling is complete the two monoazo dyes are combined and isolated at pH 7 by the addition of sodium chloride. The filtered paste of the monoazo dyes is stirred in 600 parts water and reacted with 500 parts chrome alum and 250 parts sodium acetate and stirred for 3 to 4 hours under reflux. After chromation is complete the warm mixture is adjusted to pH 7.5 with aqueous sodium hydroxide and 140 parts sodium nitrite are added thereto. The mixture is poured, with stirring, into a mixture of hydrochloric acid and ice whereupon it is diazotized. 200 parts 1,3-diaminobenzene are added to the chromium complex mixture and coupling is effected at pH 5.

The dyestuff is filtered, dried at 80° and ground. The product comprises at least 95% complex of formula I. The black powder gives grey level dyeings on leather having good light-fastness, dry-cleaning fastness, wash-fastness, sweat-fastness and migration resistance in PVC. The dye shade is stable on different types of leather and the build-up is good on leathers of low affinity.

When chromation of one of the disazo compounds is effected to give a 1:1 complex and the same is reacted further with the second disazo compound a homogeneous 1:2 complex of formula I is obtained.

Further 1:2 complexes, which can be made in accordance with the procedure described in Example 1, are given in the following Table. The dyes are a mixture of the two symmetric 1:2 complexes and the asymmetric 1:2 complex and are analogously, to Example 1, in the sodium salt form. The asymmetric 1:2 complex corresponds, in the free acid form, to formula VII

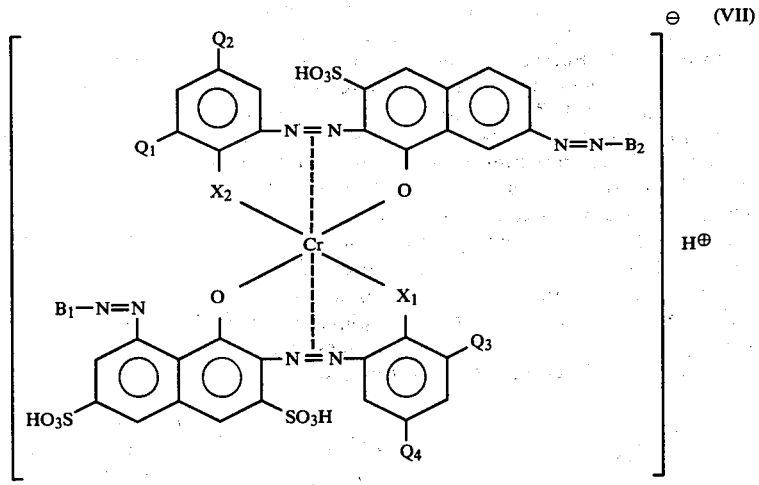

TABLE

| EX. No. | $X_2$ | $Q_1$ | $Q_2$ | $X_1$ | $Q_3$ | $Q_4$ | $B_1 = B_2$ | Shade on leather |
|---|---|---|---|---|---|---|---|---|
| 2 | —O— | —NO$_2$ | —NO$_2$ | —O— | —NO$_2$ | —SO$_3$H | naphthyl-OH | Grey |
| 3 | —O— | —NO$_2$ | —SO$_3$H | —O— | —NO$_2$ | —NO$_2$ | phenyl(NH$_2$)(H$_2$N) | " |

TABLE-continued

| EX. No. | $X_2$ | $Q_1$ | $Q_2$ | $X_1$ | $Q_3$ | $Q_4$ | $B_1 = B_2$ | Shade on leather |
|---|---|---|---|---|---|---|---|---|
| 4 | —O— | —SO$_3$H | —NO$_2$ | —O— | —NO$_2$ | —NO$_2$ | 2,4-diamino-5-methylphenyl (CH$_3$, NH$_2$, H$_2$N) | " |
| 5 | —O— | —H | —NO$_2$ | —O— | —H | —SO$_2$NH$_2$ | 2-amino-4-hydroxyphenyl (HO, NH$_2$) | " |
| 6 | —O— | —H | —SO$_3$H | —O— | —H | —SO$_2$—NHCH$_3$ | hydroxyphenyl-NH-(2-methylphenyl) (HO, NH, CH$_3$) | " |
| 7 | —O— | —H | —Cl | —O— | —H | —SO$_2$—N(CH$_3$)$_2$ | 2,4-diamino-methylphenyl (CH$_3$, NH$_2$, H$_2$N) | " |
| 8 | —O— | —H | —SO$_2$—NH$_2$ | —O— | —H | —SO$_2$—NH—C$_6$H$_5$ | 2,4-diamino-5-methylphenyl (CH$_3$, NH$_2$, H$_2$N) | " |
| 9 | —CO—O— | —H | —H | —O— | —H | HOOC-phenyl-SO$_2$NH— | 65% 2,4-diamino-5-methylphenyl; 35% 2,3-diamino-methylphenyl | " |
| 10 | —O— | —SO$_3$H | —NO$_2$ | —O— | —NO$_2$ | —NO$_2$ | Mixtures of 50 Mol % and 50 Mol % (8-hydroxyquinoline methyl and diaminophenyl) | " |
| 11 | —O— | —H | —SO$_3$H | —O— | —H | —SO$_2$—NH—C$_6$H$_5$ | 2,4-diamino-5-methylphenyl and diaminophenyl | " |
| 12 | —O— | —NO$_2$ | —SO$_3$H | —O— | —NO$_2$ | —NO$_2$ | hydroxymethylphenyl and diaminomethylphenyl | " |
| 13 | —O— | —NO$_2$ | —NO$_2$ | —O— | —H | —SO$_2$—NH—C$_6$H$_5$ | 2,4-diamino-5-methylphenyl and diaminomethylphenyl | " |

TABLE-continued

| EX. No. | $X_2$ | $Q_1$ | $Q_2$ | $X_1$ | $Q_3$ | $Q_4$ | | $B_1 = B_2$ | Shade on leather |
|---|---|---|---|---|---|---|---|---|---|
| 14 | —O— | —H | —NO$_2$ | —O— | —H | HOOC<br>—SO$_2$NH— 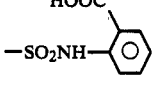 | 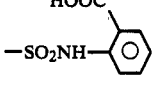 | 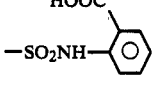 | " |
| 15 | —O— | —SO$_3$H | —NO$_2$ | —O— | —NO$_2$ | —NO$_2$ | | 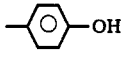 | " |
| 16 | —O— | —NO$_2$ | —SO$_3$H | —O— | —H | —SO$_2$—NH— 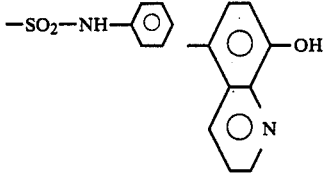 | 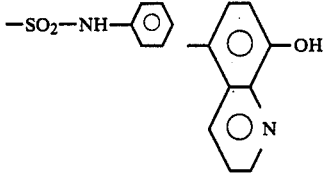 | 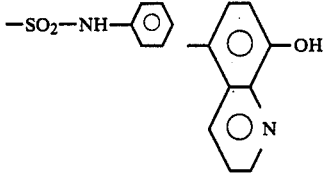 | " |
| 17 | —O— | H | —SO$_3$H | —O— | —H | —SO$_2$NH$_2$ | | 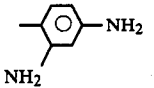 | " |

EXAMPLES 1a to 17a

Proceedings as described in Example 1 but replacing the 239 parts of 2-amino-8-hydroxy-6-sulphonaphthalene with 239 parts 3-amino-8-hydroxy-6-sulphonaphthalene a dye is obtained which gives leather dyeings of a similar shade. Further, employing the same procedure but employing the components given in Examples 2 to 9, the corresponding 3-isomers are obtained which give dyeings on leather of similar shades to those obtained with the dyes of Examples 2 to 17.

EXAMPLE 1b

Proceeding as described in Example 1 but employing 486 parts 2-amino-1-hydroxybenzene-4-sulphonic acid phenyl amide and employing 130 parts sodium nitrite for the diazotization; coupling with 510 parts 1-amino-8-hydroxy-3,6-disulphonaphthalene dissolved in 1000 parts water and 400 parts aqueous sodium hydroxide; employing 100 parts instead of 234 parts 2-amino-6-nitrophenol-4-sulphonic acid and diazotising using 33 parts sodium nitrite; and using 96 instead of 239 parts 2-amino-8-hydroxy-6-sulphonaphthalene a dyestuff is obtained in the form of a black powder which gives level grey dyeings on leather with the same high level of fastness as for the leather dyeings made with the dye of Example 1.

EXAMPLES 2b to 17b

Using the same molar ratio but employing the diazo and coupling components of Examples 2 to 17 corresponding 1:2 chromium complexes are obtained.

Further, in the above mentioned Examples when potassium hydroxide or lithium hydroxide solutions are employed, dyes in the potassium or lithium salt form instead of the sodium salt form are obtained.

The dyestuffs are mixed to 50% active substance with blending agents. In the following dyeing Examples the dyestuff amounts given are of the unblended dyestuffs.

APPLICATION EXAMPLE A 100 parts of newly tanned and neutralised chromium grain leather are milled for 30 minutes in a dye vessel in a liquor consisting of 250 parts of water at 55° and 0.5 parts of the dyestuff produced as in Example 1b; the leather is then treated in the same bath for a further 30 minutes with 2 parts of an anionic fat-liquor based on sulphonated train oil. The leather is dried and finished in the usual manner. An even dyeing in a grey shade is obtained.

APPLICATION EXAMPLE B 100 parts of calf suede are milled in a dye vessel for 4 hours with 1000 parts of water and 2 parts of ammonia and are subsequently dyed for 1½ hours in a further bath containing: 500 parts of water at 55°, 2 parts of ammonia and 5 parts of dissolved dyestuff obtained as described in Example 1b. In order to exhaust the dye bath, 4 parts of formic acid (85%) are slowly added and dyeing continues until the dyestuff has been completely fixed. After buffing the suede side, the suede leather which is rinsed, dried and finished in the usual manner is evenly dyed in a grey shade.

APPLICATION EXAMPLE C 100 parts of chromium-vegetable tanned lamb's leather and 5 parts of the dyestuff obtained as described in Example 1b are milled for 45 minutes in a dye vessel, in a liquor consisting of 1000 parts of water at 55° and 1.5 parts of an anionic sperm oil emulsion, and the dyestuff is fixed on the leather by slowly adding 5 parts of formic acid (85%) over the course of 30 minutes. After the usual drying and finishing processes, an even dyeing of a grey shade is obtained.

APPLICATION EXAMPLE D

A solution of 20 parts of the dyestuff produced as described in Example 1b in 847 parts of water, 150 parts of ethyl glycol and 3 parts of formic acid (85%) is applied by spraying, plushing and pouring to the grain side of a buffed, combined-tanned cow-hide.

The leather is dried and finished under mild conditions. A dyeing of a grey shade with good fastnesses is obtained.

In analogous manner to the procedure described in the above Examples A–D, the dyestuffs of Examples 2 to 16, 1a to 16a and 2b to 16b may be used, whereby even grey dyeings are obtained.

What is claimed is:

1. A 1:2 metal complex of the formula

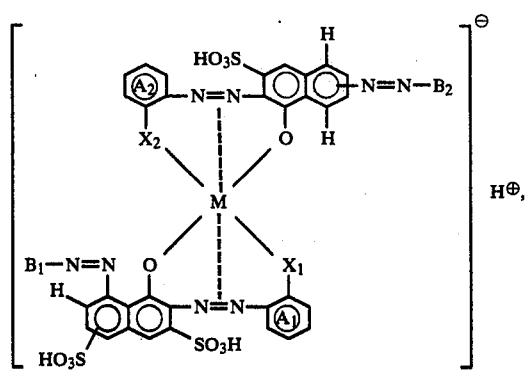

said 1:2 metal complex being in free acid or salt form, wherein each of

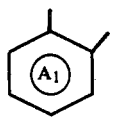 and 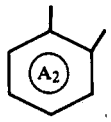

is independently the radical of a diazo component of the benzene series free from fiber-reactive groups, with the proviso that Rings $A_1$ and $A_2$ together contain a maximum of one sulfo group, each of $B_1$ and $B_2$ is independently the radical of a coupling component of the benzene or hydroxyquinoline series free from fiber-reactive groups, each of $X_1$ and $X_2$ is independently —COO— or —O—, and M is a metal capable of forming a 1:2 metal complex.

2. A 1:2 metal complex according to claim 1, said 1:2 metal complex being in free acid or salt form, wherein at least one of $X_1$ and $X_2$ is —O—.

3. A 1:2 metal complex according to claim 1, said 1:2 metal complex being in free acid or salt form, wherein each of Rings $A_1$ and $A_2$ is independently further unsubstituted or further substituted by one or two substituents selected from the group consisting of halo, nitro, $C_{1-4}$alkyl, $C_{1-4}$alkoxy, sulfo and —SO$_2$NR$_1$R$_2$, wherein R$_1$ is hydrogen or $C_{1-4}$alkyl, and R$_2$ is hydrogen, $C_{1-4}$alkyl or

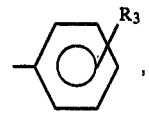

wherein R$_3$ is hydrogen, halo, $C_{1-4}$alkyl, $C_{1-4}$alkoxy or carboxy, with the provisos that (i) each of Rings $A_1$ and $A_2$ independently contains a maximum of one substituent selected from the group consisting of sulfo and —SO$_2$NR$_1$R$_2$ and (ii) Rings $A_1$ and $A_2$ together contain a maximum of one sulfo group, wherein each halo is independently fluoro, chloro, bromo or iodo.

4. A 1:2 metal complex according to claim 3, said 1:2 metal complex being in free acid or salt form, wherein each of $B_1$ and $B_2$ is independently the radical of a coupling component of the formula

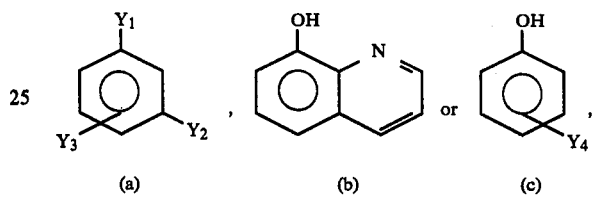

wherein
$Y_1$ is —NH$_2$ or —OH,
$Y_2$ is —NH$_2$ or

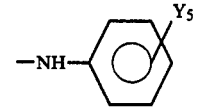

wherein $Y_5$ is hydrogen or $C_{1-4}$alkyl,
$Y_3$ is hydrogen, $C_{1-4}$alkyl, $C_{1-4}$alkoxy or chloro, with the proviso that when $Y_3$ is $C_{1-4}$alkyl, $C_{1-4}$alkoxy or chloro and $Y_1$ and $Y_2$ are both —NH$_2$, $Y_3$ is ortho or para to $Y_1$ and otherwise $Y_3$ is para to $Y_1$, and
$Y_4$ is hydrogen, $C_{1-4}$alkyl, $C_{1-4}$alkoxy or chloro, and M is chromium.

5. A 1:2 metal complex according to claim 4, said 1:2 metal complex being in free acid form or in salt form each cation of which is sodium, lithium, potassium, ammonium, ethanolammonium, diethanolammonium, triethanolammonium, isopropanolammonium, diisopropanolammonium or triisopropanolammonium.

6. A 1:2 metal complex according to claim 3, said 1:2 metal complex being in free acid or salt form, with the proviso that (i) Ring $A_1$ is further unsubstituted when $X_1$ is —COO—, and (ii) Ring $A_2$ is further unsubstituted when $X_2$ is —COO—.

7. A 1:2 metal complex according to claim 6, said 1:2 metal complex being in free acid or salt form, wherein each halo is independently chloro or bromo.

8. A 1:2 metal complex according to claim 7, said 1:2 metal complex being in free acid or salt form, wherein each of $B_1$ and $B_2$ is independently the radical of a coupling component of the formula

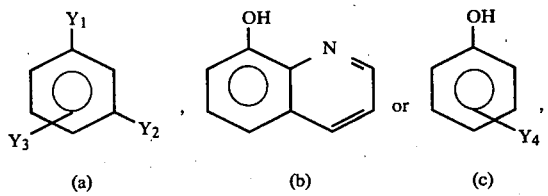

(a)   (b)   (c)

wherein
Y₁ is —NH₂ or —OH,
Y₂ is —NH₂ or

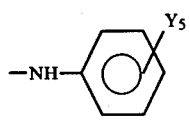

wherein Y₅ is hydrogen or $C_{1-4}$alkyl,
Y₃ is hydrogen, $C_{1-4}$alkyl, $C_{1-4}$alkoxy or chloro, with the proviso that when Y₃ is $C_{1-4}$alkyl, $C_{1-4}$alkoxy or chloro and Y₁ and Y₂ are both —NH₂, Y₃ is ortho or para to Y₁ and otherwise Y₃ is para to Y₁, and
Y₄ is hydrogen, $C_{1-4}$alkyl, $C_{1-4}$alkoxy or chloro.

9. A 1:2 metal complex according to claim 8 having the formula

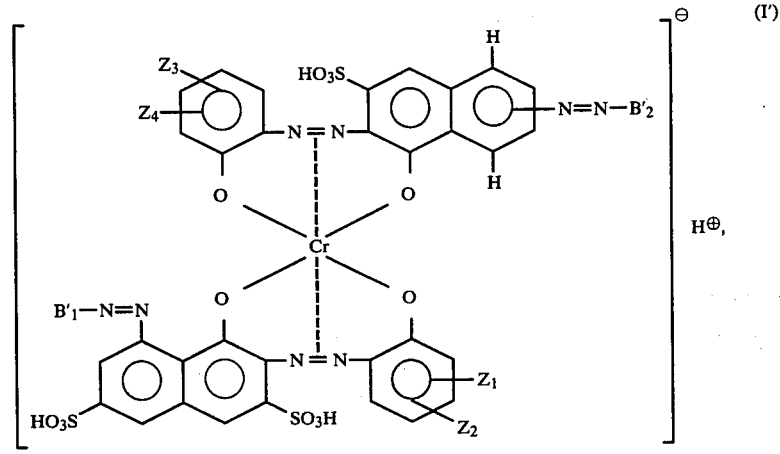

said 1:2 metal complex being in free acid or salt form, wherein each of B₁' and B₂' is independently the radical of a coupling component of the formula

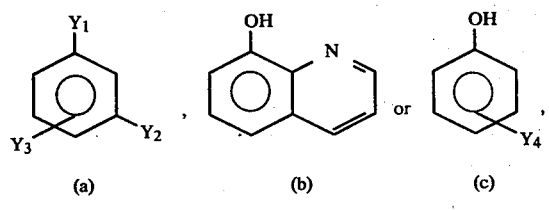

(a)   (b)   (c)

wherein
Y₁ is —NH₂ or —OH,
Y₂ is —NH₂ or

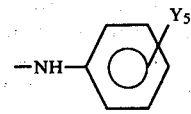

wherein Y₅ is hydrogen or $C_{1-4}$alkyl,
Y₃ is hydrogen, $C_{1-4}$alkyl, $C_{1-4}$alkoxy or chloro, with the proviso that when Y₃ is $C_{1-4}$alkyl, $C_{1-4}$alkoxy or chloro and Y₁ and Y₂ are both —NH₂, Y₃ is ortho or para to Y₁ and otherwise Y₃ is para to Y₁, and
Y₄ is hydrogen, $C_{1-4}$alkyl, $C_{1-4}$alkoxy or chloro,
each of Z₁ and Z₃ is independently hydrogen or nitro,
Z₂ is hydrogen, chloro, nitro or —SO₂NR₁'R₂', and Z₄ is hydrogen, chloro, nitro, sulfo or —SO₂NR₁'R₂',
wherein
R₁' is hydrogen or methyl, and
R₂' is hydrogen, methyl or

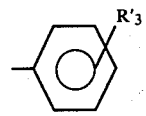

wherein R₃' is hydrogen, methoxy or carboxy,
with the proviso that when at least one sulfo group of the 1:2 metal complex is in salt form and the negative charge of the chromium ion is balanced by a cation, the cation balancing the negative charge of the chromium ion is identical to the cation of the salt form of a sulfo group of the 1:2 metal complex.

10. A 1:2 metal complex according to claim 9, said 1:2 metal complex being in free acid form or in salt form each cation of which is sodium, lithium, potassium, ammonium, ethanolammonium, diethanolammonium, triethanolammonium, isopropanolammonium, diisopropanolammonium or triisopropanolammonium.

11. A 1:2 metal complex according to claim 9, said 1:2 metal complex being in free acid or salt form, wherein
Z₂ is chloro, nitro or —SO₂NR₁'R₂', and
Z₄ is chloro, nitro, sulfo or —SO₂NR₁'R₂',
wherein
R₁' is hydrogen or methyl, and
R₂' is hydrogen, methyl or

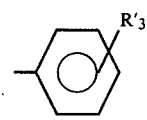

wherein $R_3'$ is hydrogen, methoxy or carboxy, with the provisos that (i) when $Z_2$ is $-SO_2NR_1'R_2'$, $Z_1$ is hydrogen and (ii) when $Z_4$ is $-SO_2NR_1'R_2'$, $Z_3$ is hydrogen.

12. A 1:2 metal complex according to claim 9, said 1:2 metal complex being in free acid or salt form, wherein each of $B_1'$ and $B_2'$ is independently the radical of a coupling component of the formula wherein each of $B_1'$ and $B_2'$ is independently the radical of a coupling component of the formula

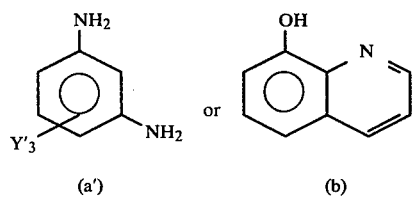

wherein $Y_3'$ is hydrogen or methyl, with the proviso that when $Y_3'$ is methyl, it is ortho to at least one of the $-NH_2$ groups.

14. The 1:2 metal complex according to claim 13 having the formula

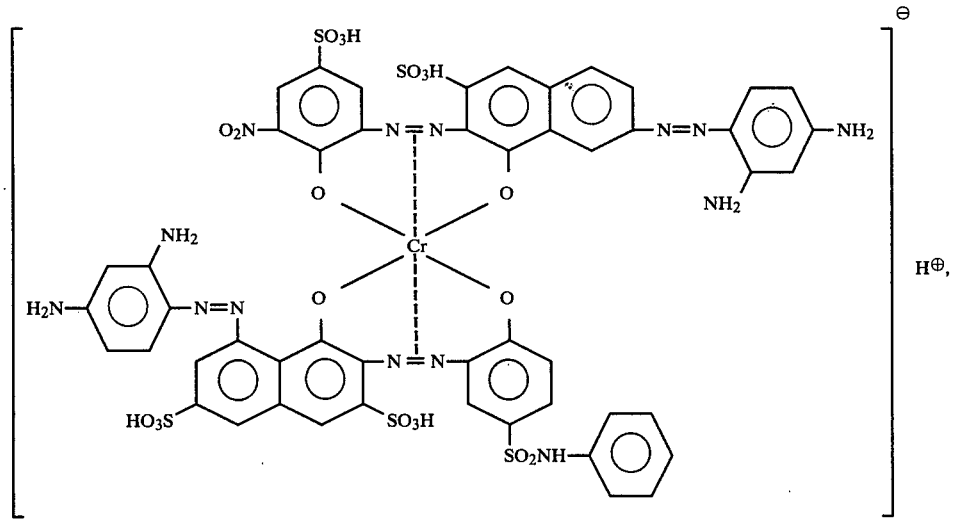

said 1:2 metal complex being in sodium salt form.

15. A mixture comprising at least one 1:2 metal complex according to claim 1 having the formula

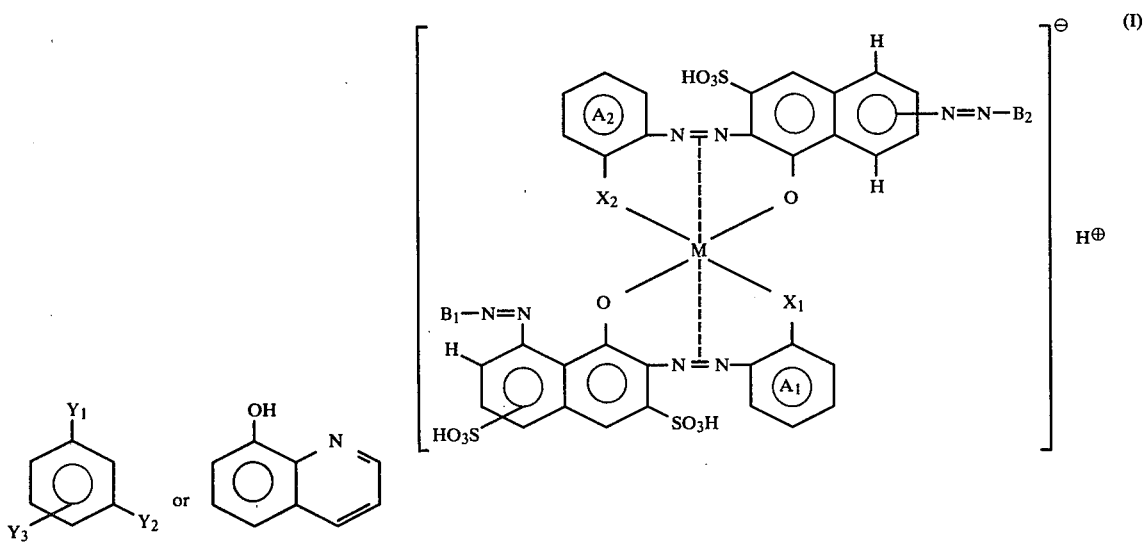

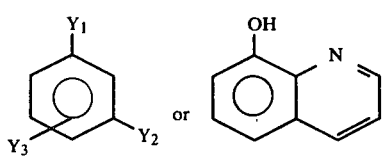

13. A 1:2 metal complex according to claim 12, said 1:2 metal complex being in free acid or salt form, and (i) at least one 1:2 metal complex of the formula

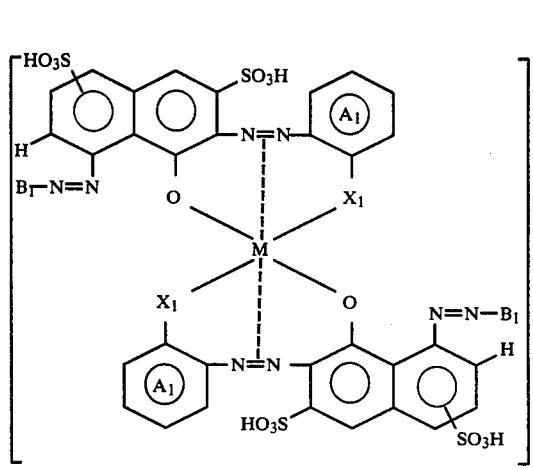
or at least one 1:2 metal complex of the formula
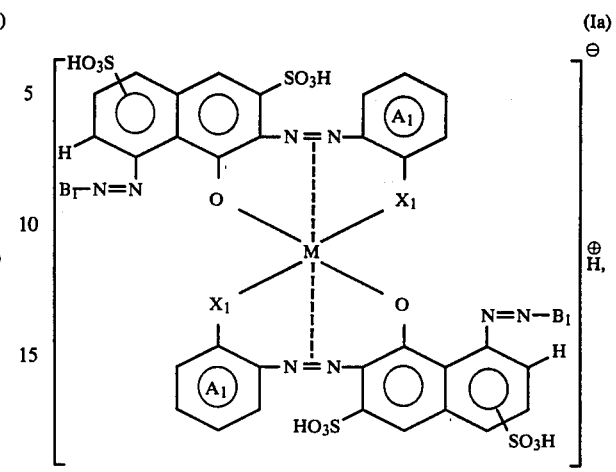
and at least one 1:2 metal complex of the formula
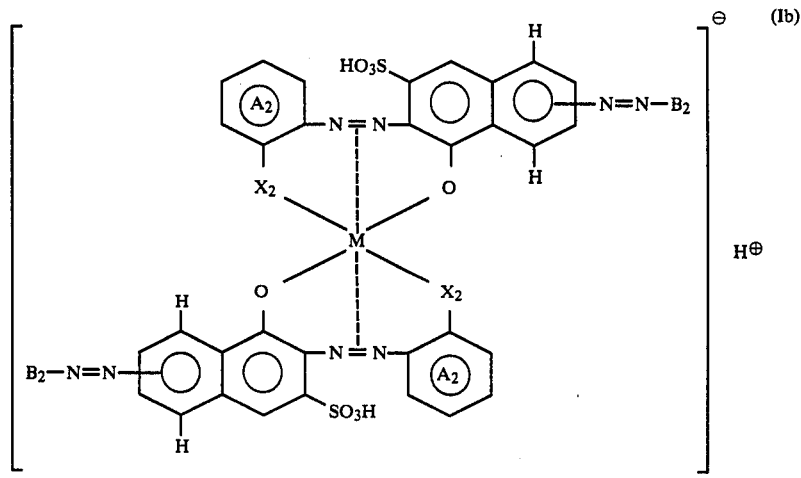
or (ii) at least one 1:2 metal complex of the formula
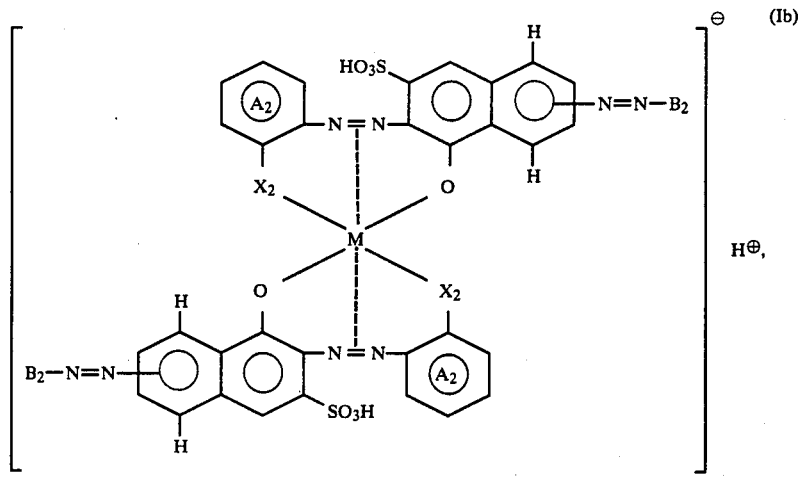
said 1:2 metal complexes being in free acid or salt form, wherein each

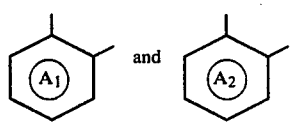

is independently the radical of a diazo component of the benzene series free from fiber-reactive groups, with the proviso that Rings $A_1$ and $A_2$, when present in a single 1:2 metal complex, together contain a maximum of one sulfo group, each $B_1$ and $B_2$ is independently the radical of a coupling component of the benzene or hydroxyquinoline series free from fiber-reactive groups, each $X_1$ and $X_2$ is independently —COO— or —O—, and each M is a metal capable of forming a 1:2 metal complex.

16. A mixture of 1:2 metal complexes according to claim 15, said 1:2 metal complexes being in free acid or salt form, wherein at least one of $X_1$ and $X_2$ of each 1:2 metal complex containing an $X_1$ radical and an $X_2$ radical is —O—, at least one $X_1$ of each 1:2 metal complex containing two $X_1$ radicals is —O—, and at least one $X_2$ of each 1:2 metal complex containing two $X_2$ radicals is —O—.

17. A mixture of 1:2 metal complexes according to claim 15, said 1:2 metal complexes being in free acid or salt form, wherein each Ring $A_1$ and $A_2$ is independently further unsubstituted or further substituted by one or two substituents selected from the group consisting of halo, nitro, $C_{1-4}$alkyl, $C_{1-4}$alkoxy, sulfo and —$SO_2NR_1R_2$, wherein $R_1$ is hydrogen or $C_{1-4}$alkyl, and
$R_2$ is hydrogen, $C_{1-4}$alkyl or

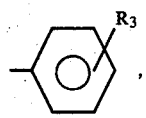

wherein
$R_3$ is hydrogen, halo, $C_{1-4}$alkyl, $C_{1-4}$alkoxy or carboxy, with the provisos that (i) each Ring $A_1$ and $A_2$ independently contains a maximum of one substituent selected from the group consisting of sulfo and —$SO_2NR_1R_2$ and (ii) Rings $A_1$ and $A_2$, when present in a single 1:2 metal complex, together contain a maximum of one sulfo group, wherein each halo is independently fluoro, chloro, bromo or iodo.

18. A mixture of 1:2 metal complexes according to claim 17, said 1:2 metal complexes being in free acid or salt form, wherein each $B_1$ and $B_2$ is independently the radical of a coupling component of the formula

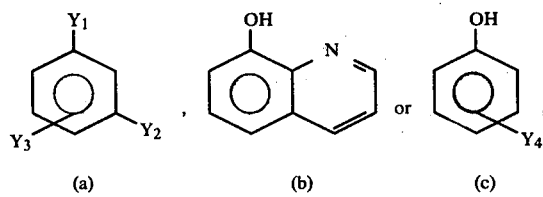

wherein
$Y_1$ is —$NH_2$ or —OH,
$Y_2$ is —$NH_2$ or $Y_1$ is —$NH_2$ or —OH,
$Y_2$ is —$NH_2$ or

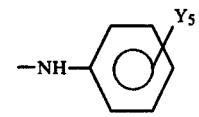

wherein $Y_5$ is hydrogen or $C_{1-4}$alkyl,
$Y_3$ is hydrogen, $C_{1-4}$alkyl, $C_{1-4}$alkoxy or chloro, with the proviso that when $Y_3$ is $C_{1-4}$alkyl, $C_{1-4}$alkoxy or chloro and $Y_1$ and $Y_2$ are both —$NH_2$, $Y_3$ is ortho or para to $Y_1$ and otherwise $Y_3$ is para to $Y_1$, and
$Y_4$ is hydrogen, $C_{1-4}$alkyl, $C_{1-4}$alkoxy or chloro, and M is chromium.

19. A mixture of 1:2 metal complexes according to claim 18, said 1:2 metal complexes being in free acid form or in salt form each cation of which is sodium, lithium, potassium, ammonium, ethanolammonium, diethanolammonium, triethanolammonium, isopropanolammonium, diisopropanolammonium or triisopropanolammonium.

20. A mixture of 1:2 metal complexes according to claim 17, said 1:2 metal complexes being in free acid or salt form, wherein each $X_1$ is —O—, and each $X_2$ is —O—.

21. A mixture of 1:2 metal complexes according to claim 20, said 1:2 metal complexes being in free acid or salt form, wherein each halo is independently chloro or bromo.

22. A mixture of 1:2 metal complexes according to claim 21, said 1:2 metal complexes being in free acid or salt form, wherein $R_1$ is hydrogen or methyl, and
$R_2$ is hydrogen, methyl or

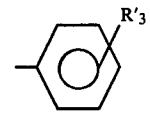

wherein $R_3'$ is hydrogen, methoxy or carboxy.

23. A mixture of 1:2 metal complexes according to claim 21, said 1:2 metal complexes being in free acid or salt form, wherein each $B_1$ and $B_2$ is independently the radical of a coupling component of the formula

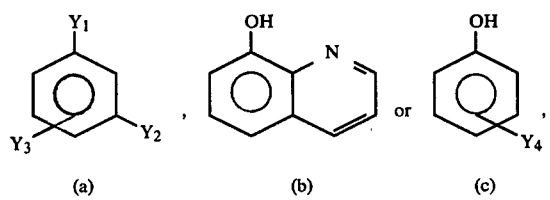

wherein
$Y_1$ is —$NH_2$ or —OH,
$Y_2$ is —$NH_2$ or

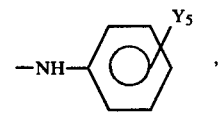

wherein $Y_5$ is hydrogen or $C_{1-4}$alkyl, $Y_3$ is hydrogen, $C_{1-4}$alkyl, $C_{1-4}$alkoxy or chloro, with the proviso that when $Y_3$ is $C_{1-4}$alkyl, $C_{1-4}$alkoxy or chloro and $Y_1$ and $Y_2$ are both —$NH_2$, $Y_3$ is ortho or para to $Y_1$ and otherwise $Y_3$ is para to $Y_1$, and $Y_4$ is hydrogen, $C_{1-4}$alkyl, $C_{1-4}$alkoxy or chloro.

24. A mixture of 1:2 metal complexes according to claim 23 comprising at least one 1:2 metal complex of the formula

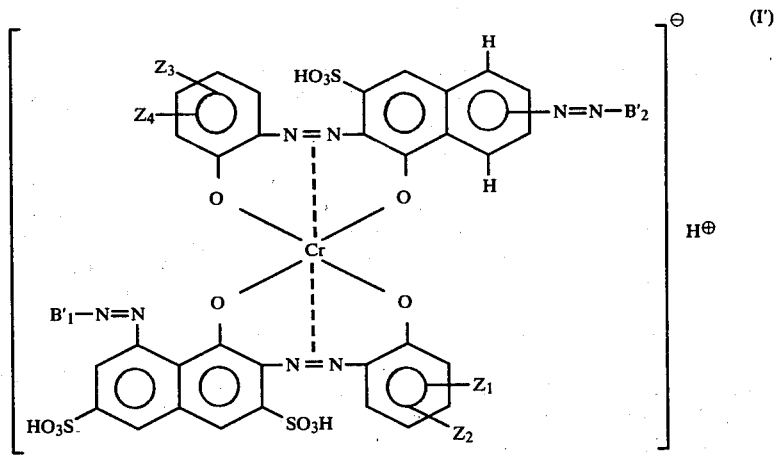 (I′)

and (i) at least one 1:2 metal complex of the formula

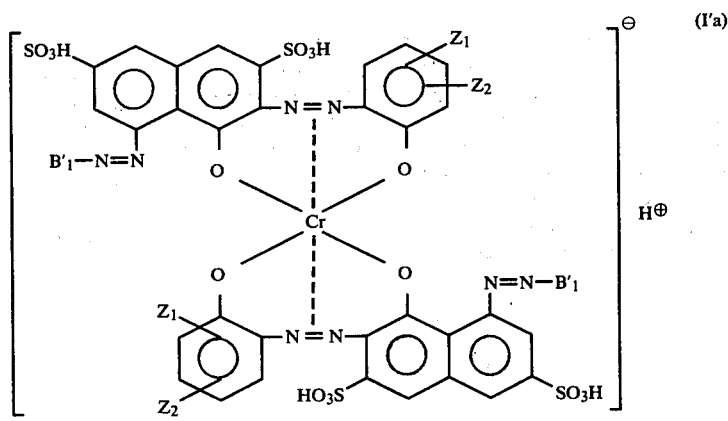 (I′a)

or at least one 1:2 metal complex of the formula

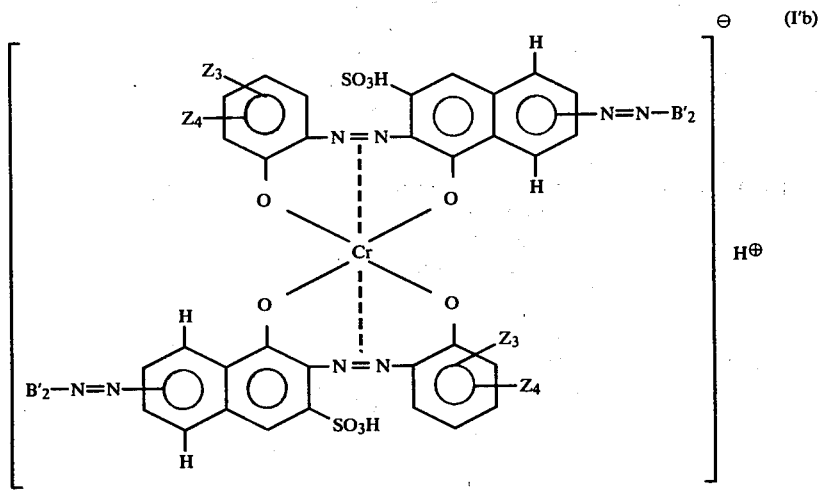 (I′b)

or (ii) at least one 1:2 metal complex of the formula

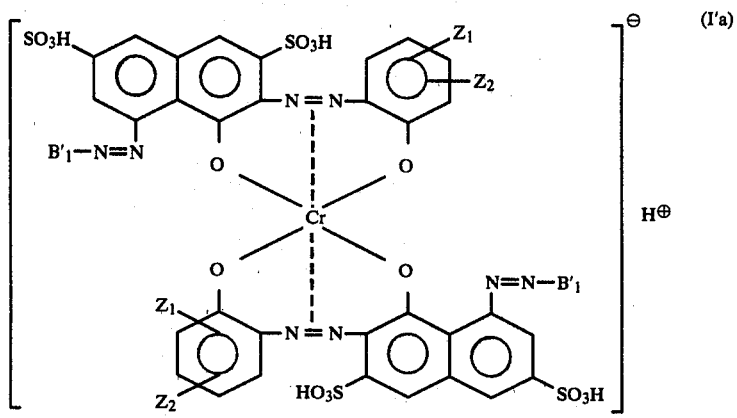

and at least one 1:2 metal complex of the formula

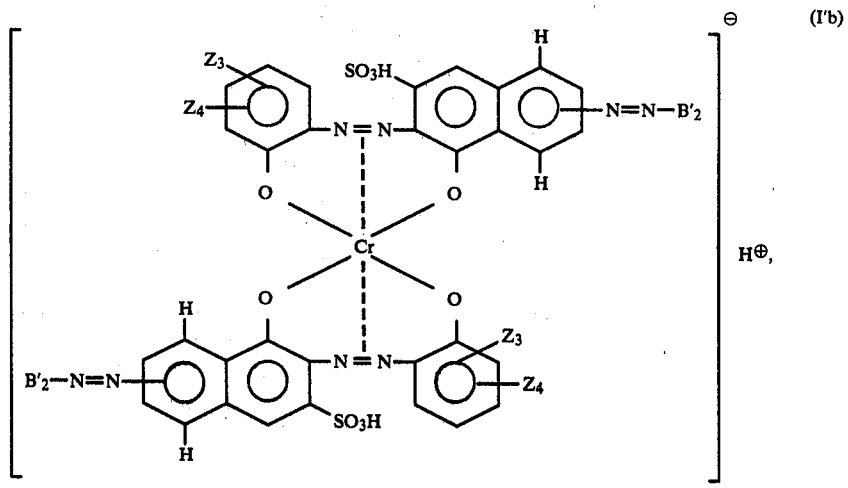

said 1:2 metal complexes being in free acid or salt form, wherein each $B_1'$ and $B_2'$ is independently the radical of a coupling component of the formula

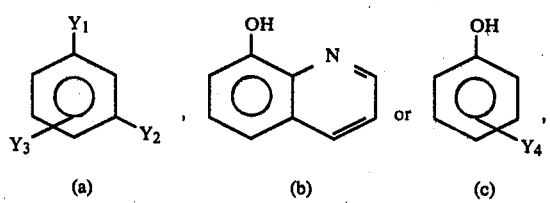

wherein
$Y_1$ is $-NH_2$ or $-OH$,
$Y_2$ is $-NH_2$ or

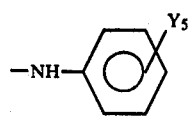

wherein $Y_5$ is hydrogen or $C_{1-4}$alkyl,
$Y_3$ is hydrogen, $C_{1-4}$alkyl, $C_{1-4}$alkoxy or chloro, with the proviso that when $Y_3$ is $C_{1-4}$alkyl, $C_{1-4}$alkoxy or chloro and $Y_1$ and $Y_2$ are both $-NH_2$, $Y_3$ is ortho or para to $Y_1$ and otherwise $Y_3$ is para to $Y_1$, and
$Y_4$ is hydrogen, $C_{1-4}$alkyl, $C_{1-4}$alkoxy or chloro, each $Z_1$ and $Z_3$ is independently hydrogen or nitro, each $Z_2$ is independently hydrogen, chloro, nitro or $-SO_2NR_1'R_2'$, and
each $Z_4$ is independently hydrogen, chloro, nitro, sulfo or $-SO_2NR_1'R_2'$,
wherein
$R_1'$ is hydrogen or methyl, and
$R_2'$ is hydrogen, methyl or

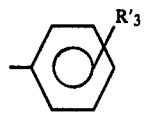

wherein $R_3'$ is hydrogen, methoxy or carboxy.

25. A mixture of 1:2 metal complexes according to claim 24, said 1:2 metal complexes being in free acid form or in salt form each cation of which is sodium, lithium, potassium, ammonium, ethanolammonium, diethanolammonium, triethanolammonium, isopropanolammonium, diisopropanolammonium or triisopropanolammonium.

26. A mixture of 1:2 metal complexes according to claim 24, said 1:2 metal complexes being in free acid or salt form, wherein each $B_1'$ and $B_2'$ is independently the radical of a coupling component of the formula

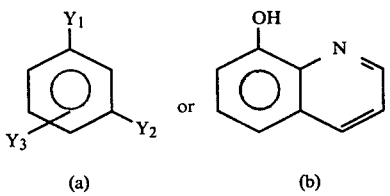

(a)  or  (b)

27. A mixture of 1:2 metal complexes according to claim 28, said 1:2 metal complexes being in free acid or salt form, wherein each $B_1'$ and $B_2'$ is independently the radical of a coupling component of the formula

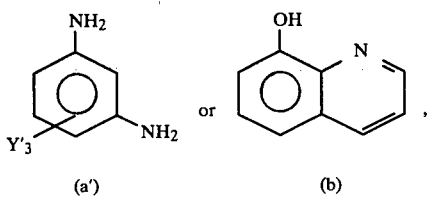

(a')  or  (b)

wherein $Y_3'$ is hydrogen or methyl, with the proviso that when $Y_3'$ is methyl, it is ortho to at least one of the —$NH_2$ groups.

28. A mixture of 1:2 metal complexes according to claim 27, said 1:2 metal complexes being in free acid or salt form, wherein $Y_3'$ is hydrogen.

29. A mixture of 1:2 metal complexes according to claim 27, said 1:2 metal complexes being in free acid or salt form, wherein each $B_1'$ and $B_2'$ is independently the radical of a coupling component of the formula

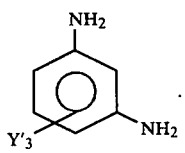

30. A mixture of 1:2 metal complexes according to claim 29, said 1:2 metal complexes being in free acid or salt form, with the proviso that when any $Z_2$ is —$SO_2NR_1'R_2'$, the $Z_1$ attached to the same ring is hydrogen, and when any $Z_4$ is —$SO_2NR_1'R_2'$, the $Z_3$ attached to the same ring is hydrogen.

31. A mixture of 1:2 metal complexes according to claim 24, said 1:2 metal complexes being in free acid or salt form, wherein
   each $B_1'$ is the same,
   each $B_2'$ is the same,
   each $Z_1$ is the same,
   each $Z_2$ is the same,
   each $Z_3$ is the same, and
   each $Z_4$ is the same.

32. A mixture of 1:2 metal complexes according to claim 31, said 1:2 metal complexes being in free acid or salt form, wherein the $B_1'$'s and $B_2'$'s are the same.

33. A mixture of 1:2 metal complexes according to claim 32, said 1:2 metal complexes being in free acid or salt form, wherein
   each $B_2'$—N=N— is in the 7-position,
   each $Z_1$ is in the same position,
   each $Z_2$ is in the same position,
   each $Z_3$ is in the same position, and
   each $Z_4$ is in the same position.

34. A mixture of 1:2 metal complexes according to claim 33, said 1:2 metal complexes being in a sodium, lithium, potassium or ammonium salt form, with the proviso that the negative charge of the chromium ion is balanced by hydrogen or the cation of the salt form of the sulfo groups.

35. A mixture of 1:2 metal complexes according to claim 15, said 1:2 metal complexes being in free acid or salt form and being the 1:2 metal complexes of a metal capable of forming 1:2 metal complexes and a mixture of at least one metal-free compound of the formula

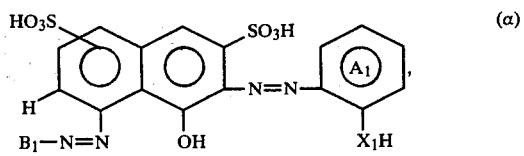

(α)

with the proviso that the mixture of metal-free compounds contains 50-95 mole % of the compound or compounds of said formula, and at least one metal-free compound of the formula

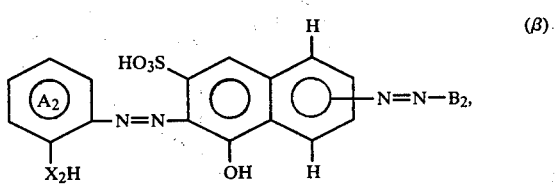

(β)

with the proviso that the mixture of metal-free compounds contains 5-50 mole % of the compound or compounds of said formula, wherein
   each

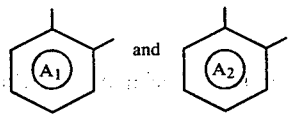

is independently the radical of a diazo component of the benzene series free from fiber-reactive groups, with the proviso that Rings $A_1$ and $A_2$ together contain a maximum of one sulfo group,
   each $B_1$ and $B_2$ is independently the radical of a coupling component of the benzene or hydroxyquinoline series free from fiber-reactive groups, and
   each $X_1$ and $X_2$ is independently —COO— or —O—.

36. A mixture of 1:2 metal complexes according to claim 35, said 1:2 metal complexes being in free acid or salt form and being the 1:2 metal complexes of chromium and a mixture of (i) one or two metal-free compounds of the formula

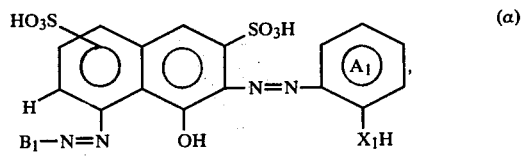

(a)

with the provisos that the mixture of metal-free compounds contains 50-95 mole % of the compound or compounds of said formula and that, when the mixture of metal-free compounds contains two compounds of said formula, the two compounds are identical except for the $B_1$ group, and (ii) one or two metal-free compounds of the formula

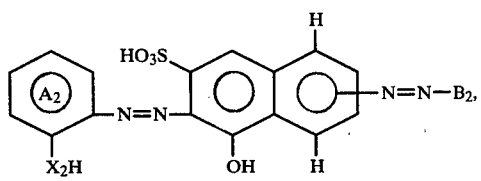

with the provisos that the mixture of metal-free compounds contains 5–50 mole % of the compound or compounds of said formula, and that, when the mixture of metal-free compounds contains two compounds of said formula, the two compounds are identical except for the $B_2$ group.

37. A mixture of 1:2 metal complexes according to claim 36, said 1:2 metal complexes being in sodium salt form and being the 1:2 metal complexes of chromium and a mixture of the metal-free compound of the formula

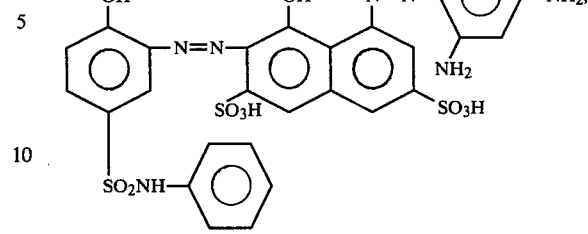

(β)

with the proviso that the mixture of metal-free compounds contains about 80 mole % of the compound of said formula, and the metal-free compound of the formula

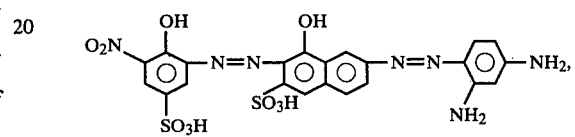

with the proviso that the mixture of metal-free compounds contains about 20 mole % of the compound of said formula.

38. A process for dyeing or printing an anionic dyeable substrate comprising applying to an anionic dyeable substrate, as a dyeing or printing agent, a 1:2 metal complex according to claim 1.

39. A process for dyeing or printing an anionic dyeable substrate comprising applying to an anionic dyeable substrate, as a dyeing or printing agent, a mixture of 1:2 metal complexes according to claim 15.

* * * * *